United States Patent
Ashkar et al.

(10) Patent No.: US 10,096,081 B2
(45) Date of Patent: Oct. 9, 2018

(54) ADAPTIVE FILTERING OF PACKETS IN A GRAPHICS PROCESSING SYSTEM

(71) Applicant: Advanced Micro Devices, Inc., Sunnyvale, CA (US)

(72) Inventors: Alexander Fuad Ashkar, Fort Collins, CO (US); Harry J. Wise, Fort Collins, CO (US); Rex Eldon McCrary, Fort Collins, CO (US); Angel E. Socarras, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 62 days.

(21) Appl. No.: 15/270,679

(22) Filed: Sep. 20, 2016

(65) Prior Publication Data

US 2018/0082398 A1    Mar. 22, 2018

(51) Int. Cl.
| | |
|---|---|
| G06T 1/00 | (2006.01) |
| G06F 15/00 | (2006.01) |
| G06T 1/20 | (2006.01) |
| G06F 1/32 | (2006.01) |
| G06F 3/06 | (2006.01) |
| G06T 1/60 | (2006.01) |

(52) U.S. Cl.
CPC ............... *G06T 1/20* (2013.01); *G06F 1/325* (2013.01); *G06F 3/0604* (2013.01); *G06F 3/0638* (2013.01); *G06F 3/0685* (2013.01); *G06T 1/60* (2013.01)

(58) Field of Classification Search
CPC . G06T 1/60; G06T 1/20; G06F 3/0685; G06F 3/0638; G06F 3/0604; G06F 1/325
See application file for complete search history.

(56) References Cited

U.S. PATENT DOCUMENTS

| | | | |
|---|---|---|---|
| 6,453,387 B1 * | 9/2002 | Lozano | G06F 12/127 711/133 |
| 9,602,437 B1 * | 3/2017 | Bernath | H04L 49/3054 |
| 2011/0242119 A1 * | 10/2011 | Bolz | G06T 15/005 345/522 |

OTHER PUBLICATIONS

AMD, "Radeon Southern Islands Acceleration", Revision 1.0, Apr. 18, 2012, 49 pages.

* cited by examiner

*Primary Examiner* — Robert Craddock (57) ABSTRACT

An adaptive list stores previously received hardware state information that has been used to configure a graphics processing core. One or more filters are configured to filter packets from a packet stream directed to the graphics processing core. The packets are filtered based on a comparison of hardware state information included in the packet and hardware state information stored in the adaptive list. The adaptive list is modified in response to filtering the first packet. The filters can include a hardware filter and a software filter that selectively filters the packets based on whether the graphics processing core is limiting throughput. The adaptive list can be implemented as content-addressable memory (CAM), a cache, or a linked list.

20 Claims, 5 Drawing Sheets

ADAPTIVE FILTERING OF PACKETS IN A GRAPHICS PROCESSING SYSTEM

BACKGROUND

Description of the Related Art

Graphics processing systems are used to generate images of scenes that are represented by models that can be created and manipulated by the graphics processing system. Objects in a 3-D model of a scene are typically represented by patches or primitives that are processed by a graphics pipeline to produce images for display on the screen. For example, a game or an application programming interface (API) can issue a draw call (or dispatch request) to initiate processing of a primitive by a graphics processing unit (GPU). Hardware state information is used to configure the GPU to interpret and render the input data provided in response to the draw call. Examples of hardware state information include user configuration state information, shader state information, context information, rasterizer state information, blend state information, depth stencil state information, and the like.

Software executing on a central processing unit (CPU) generates the hardware state information and provides it (in packet form) to a command processor, which uses the information in the packets to modify values of registers that are used to configure the GPU prior to issuing the draw call. The software manipulates the CPU to generate the hardware state information independently for each draw call. However, every draw call does not necessarily cause the generation of a completely different set of hardware state information. To the contrary, the software executing on the CPU frequently retransmits some or all of the same hardware state information for multiple draw calls due to the systematic nature of graphics processing. Command processors that process packets including the hardware state information are therefore frequently processing redundant packets, which wastes power and degrades performance of the graphics processing system.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Power consumption in a graphics processing system can be reduced, and performance of the processing system enhanced, by filtering packets that include hardware state information that is the same as previously received hardware state information that has already been used to set values of registers that configure a GPU to process data requested by a draw call. The hardware state information in a packet can include one or more entries that include one or more sets of data, one or more lists of data, a hash to a list of hardware state data that is stored in a memory, and the like. The previously received hardware state information is stored by a storage element in a data structure (referred to herein as "an adaptive list") that is updated in response to receiving the packets. The packets can be filtered individually by comparing an address indicating the destination of data in the packet (e.g., an address of a register) and the data to address/data combinations stored in the adaptive list. The packets can also be filtered in groups by comparing a group identifier in the packets and the data in the packets to group identifier/data combinations stored in the adaptive list. In some variations, the data in a packet (or group of packets) is hashed and compared to hashed values stored in the data structure. Packets (or groups of packets) that are redundant with packets (or groups of packets) that have been recently processed to configure the hardware state of the graphics system are therefore filtered out, which reduces the number of packets of hardware state information that are processed by the command processor.

The graphics processing system performs packet filtering in hardware on the basis of entries stored in an adaptive list that is implemented as a cache or content-addressable memory (CAM). A hardware filter (that is, a filter implemented in hard-coded logic or programmable logic) compares one or more entries in a packet (or group of packets) to values in the entries of the cache or CAM. The packet (or group of packets) is dropped if the hardware filter detects a hit in all entries in the packet, e.g., if all of the data in the packet (or group of packets) is the same as data in a previously received packet (or group of packets). The packet (or group of packets) is transmitted to the command processor if the hardware filter detects a miss in the cache or CAM, e.g., if one or more of the entries in the packet (or group of packets) is not the same as data in any of the previously received packet (or packets) associated with an entry in the cache or CAM. In response to a miss, information in the packet (or group of packets) is used to add a new entry to the cache or CAM and an oldest entry is dropped from the cache or CAM.

Packet filtering is also selectively performed by one or more processors executing software depending on whether processing in the graphics pipeline is GPU-limited. For example, software executing on the CPU can use an adaptive list that is implemented as a CAM or a linked-list to filter packets (or groups of packets) prior to providing the packets to a hardware portion of the graphics processing system in response to the CPU failing to receive a draw call or dispatch request from the GPU for an interval of time that indicates that the GPU is a bottleneck in the pipeline. The software refrains from transmitting the packet (or group of packets) to the hardware via a hardware/software interface if the software detects a hit in the CAM or the linked list. The packet (or group of packets) is transmitted to the hardware via the hardware/software interface if the software detects a miss in the CAM or linked-list. Information in the packet (or group of packets) is then used to modify the CAM or the linked-list. For example, a new entry can be added to the head of the linked-list in response to a miss and an existing entry can be moved to the head of the linked-list in response to a hit. Combining hardware packet filtering with selective software packet filtering allows the graphics processing system to reduce power consumption, buffer occupancy, and the like, using software and hardware packet filtering when the CPU has available processing cycles, while still improving performance using only hardware packet filtering when the CPU does not have cycles to spare.

Figure 1:
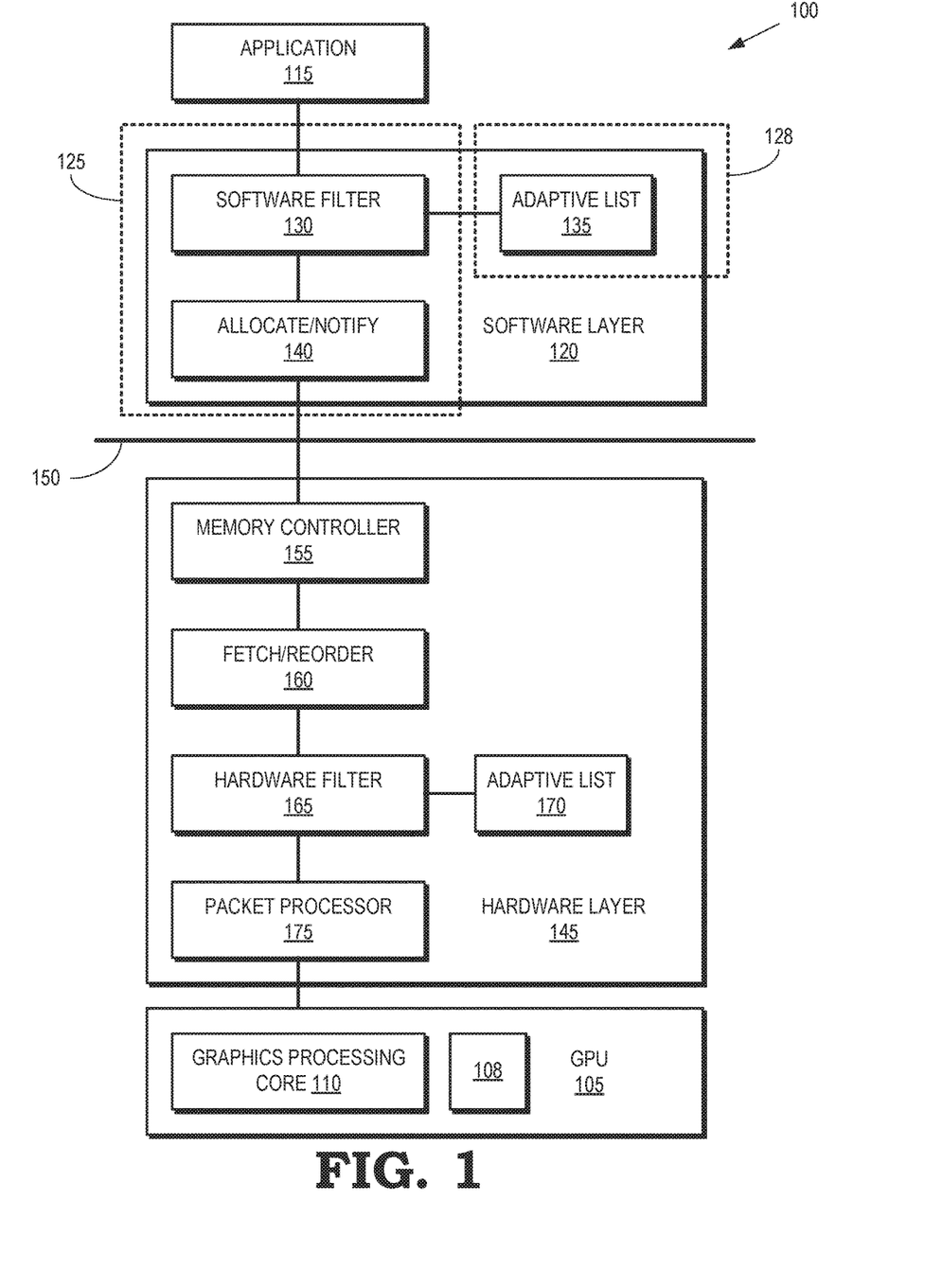
FIG. 1 is a block diagram of a graphics processing system according to some embodiments.

FIG. 1 is a block diagram of a graphics processing system 100 according to some embodiments. The graphics processing system 100 includes a graphics processing unit (GPU) 105 that implements one or more graphics processing cores 110. In the interest of clarity, only one graphics processing core 110 is shown in the GPU 105. However, some embodiments of the GPU 105 implement more than one graphics processing core 110 for performing multiple graphics operations concurrently or in parallel. The graphics processing core 110 is used to generate information such as values of pixels that represent images of a scene. The graphics processing core 110 typically renders the image of the scene (or portion thereof) in response to a draw call issued by an application 115, which can be a game, a video processing application, an application programming interface (API), and the like.

In addition to the information representative of the scene that is to be rendered, the application 115 provides hardware state information that is used to configure the graphics processing core 110 (or the GPU 105) to render the image. Examples of hardware state information include user configuration state information, shader state information, context information, rasterizer state information, blend state information, depth stencil state information, and the like. The hardware state information is provided in packet form so that each packet includes one or more entries that hold corresponding values of the hardware state information. The packets can also include addresses that indicate a destination of the hardware state information, such as addresses of registers 108 in the GPU 105. The hardware state information is stored in registers 108 to configure the GPU 105 or the graphics processing core 110 for processing the information representative of the scene. In some embodiments, the packets can be transmitted as groups of packets that are identified by a group identifier.

The graphics processing system 100 includes a software layer 120 that is implemented using instructions executed by a processing unit such as a central processing unit (CPU) 125. For example, the CPU 125 can be configured to execute instructions to perform the operations defined for the software layer 120. The instructions and corresponding data (including data consumed by the instructions and results produced by execution of the instructions) can be stored in a storage element such as a memory 128 that can be implemented as a DRAM associated with the CPU 125. The software layer 120 receives packetized information from the application 115, such as a packet stream including packets of hardware state information that are used to configure the GPU 105 or the graphics processing core 110.

The software layer 120 implements a software filter 130 to filter packets in the packet stream based on a comparison of hardware state information included in the packets and previously received hardware state information. The software filter 130 is implemented at least in part by the CPU 125 or other processor executing sets of instructions representing at least a portion of the functionality of the software filter 130. The instructions representing the functionality of the software filter 130 can be stored in the memory 128. The software filter 130 filters the packets based on a comparison of the hardware state information included in the packets and the previously received hardware state information that has been used to configure the graphics processing core. Packets are dropped if all of the hardware state information included in the packets is the same as previously received hardware state information. Packets are transmitted by the software filter 130 if at least some of the hardware state information included in the packets differs from the previously received hardware state information.

An adaptive list 135 stores previously received hardware state information that has been used to configure the graphics processing core 110. Some embodiments of the adaptive list 135 are implemented as a portion of the memory 128. The hardware state information can include configuration data used to configure the registers 108 and addresses of the registers 108. Some embodiments of the adaptive list 135 can therefore store combinations of the configuration data and addresses of the destinations of the configuration data. Some embodiments of the adaptive list 135 store combinations of the configuration data in groups of packets and identifiers of the groups. The information stored in the adaptive list 135 can be hashed or compressed in some other manner to reduce the size of the adaptive list 135. Some embodiments of the adaptive list 135 are implemented as a linked list or a content-addressable memory (CAM). The size of the adaptive list 135 can be limited to eight double words (DW), sixteen DW, or thirty-two DW. The adaptive list 135 is modified in response to hits (i.e., the hardware state information included in a packet is the same as previously received hardware state information in an entry of the adaptive list 135) or misses (i.e., the hardware state information included in a packet differs from the previously received hardware state information in the entries of the adaptive list 135). For example, the processor 125 can modify the adaptive list 135 that is stored in the memory 128.

Some embodiments of the software filter 130 selectively filter packets in the packet stream depending on whether the graphics processing core 110 is limiting throughput of the graphics processing system 100. The graphics processing core 110 can limit throughput of the graphics processing system 100 if packets are provided to the graphics processing core 110 faster than the graphics processing core 110 can process the packets. The graphics processing system 100 can detect a bottleneck at the graphics processing core 110 based on information that is (or is not) received from the GPU 105. For example, the CPU 125 can detect that the graphics processing core 110 is limiting throughput if the CPU 125 fails to receive a draw call or dispatch request from the GPU 105 for a threshold interval of time that indicates that the GPU 105 is a bottleneck in the pipeline. Since the CPU 125 does not need to process packets to provide to the GPU 105 when the graphics processing core 110 is a bottleneck, the available processing cycles at the CPU 125 can be allocated to filtering without impacting overall throughput. The software filter 130 can therefore be configured to filter packets in the packet stream when the graphics processing core 110 is limiting throughput. Filtering of the packets in the packet stream by the software filter 130 is bypassed when the graphics processing core 110 is not limiting throughput.

The packet stream is provided to an allocate/notify block 140 that performs memory allocation and notification of entities in a hardware layer 145. The packet stream provided to the hardware layer 145 is a filtered packet stream if the software filter 130 is filtering the packet stream received from the application 115 and the packet stream is an unfiltered packet stream including all of the packets received from the application 115 if the software filter 130 is bypassed. The allocate/notify block 140 transmits the packet stream across the software/hardware interface 150 to the hardware layer 145. A memory controller 155 receives the packet stream from the software layer 120. The memory controller 155 is used to manage the flow of data to and from memory elements in the graphics processing system 100. The hardware layer 145 also includes fetch/reorder logic 160 that is used to fetch packets and, in the case of out-of-order processing, to reorder packets in program order if necessary.

The fetch/reorder logic 160 provides packets from the (filtered or unfiltered) packet stream to a hardware filter 165 that is implemented in hard-coded logic, programmable logic, or a combination thereof. The hardware filter 165 is configured to filter packets in the packet stream based on a comparison of hardware state information included in the packets and an adaptive list 170 of values that represent previously received hardware state information that has been used to configure the graphics processing core 110. As discussed herein, the hardware state information stored in the adaptive list 170 can include configuration data, addresses of destinations of the configuration data such as the registers 108, group identifiers, or hashes of various combinations of the configuration data, addresses, or group identifiers. Some embodiments of the adaptive list 170 are implemented as a cache or a content-addressable memory (CAM). The size of the adaptive list 170 can be limited to 16 DW or 32 DW. The adaptive list 170 is modified in response to misses, e.g., a least-recently-used entry in the adaptive list 170 can be evicted and replaced with an entry that includes the hardware state information in a newly received packet when the hardware state information in the newly received packet differs from the previously received hardware state information in the entries of the adaptive list 170.

A filtered packet stream produced by the hardware filter 165 (and the software filter 130 when the software filter 130 is not bypassed) is provided to a packet processor 175, which uses the configuration data in the packets of the packet stream to configure the GPU 105 or the graphics processing core 110. For example, the packet processor 175 can use the configuration data in the packets and the destination addresses associated with the configuration data to configure the values of registers 108 that determine the operating state of the GPU 105 or the graphics processing core 110. The packet processor 175 also provides other packets to the GPU 105, such as data or instructions that are used for rendering images. Filtering the packets in the packet stream to remove redundant packets that include previously received hardware state information before providing the packets to the packet processor 175 can improve overall performance of the graphics processing system 100 and the GPU 105 (e.g., by increasing the achievable frames per second), as well as improving the power efficiency by reducing the overhead in packet processing by the packet processor 175.

Figure 2:
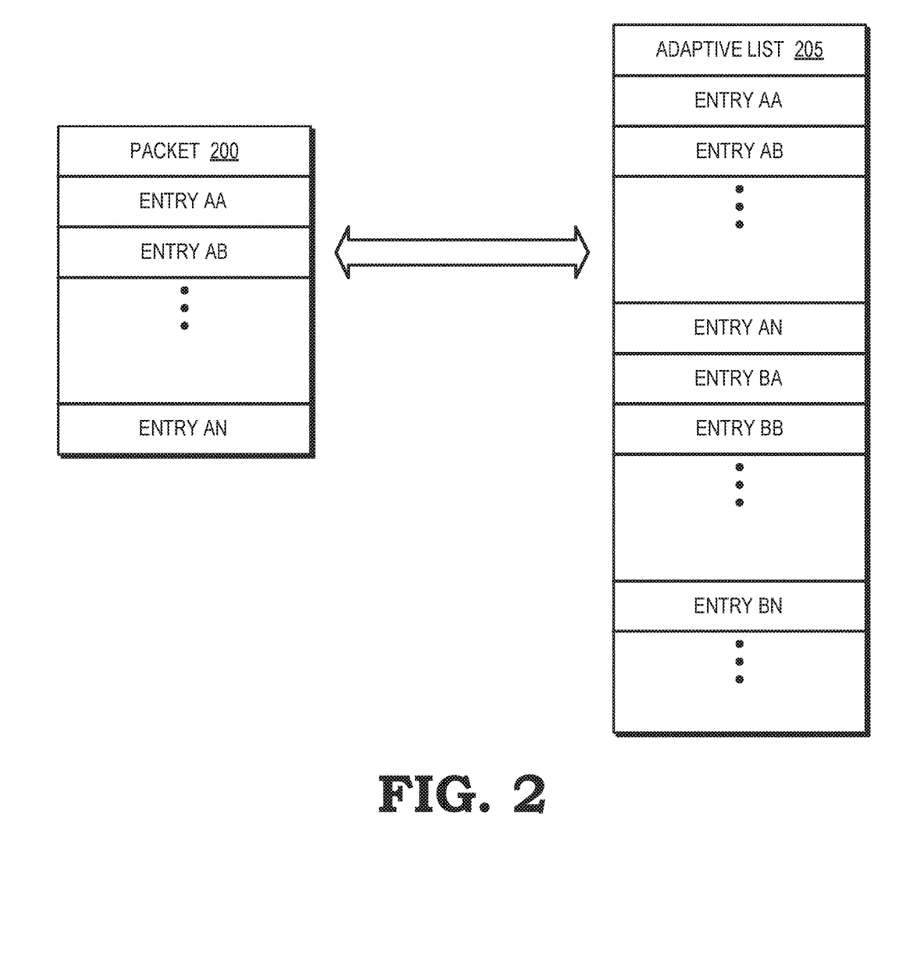
FIG. 2 is a block diagram illustrating a packet including hardware state information that is used to configure a graphics processing core according to some embodiments.

FIG. 2 is a block diagram illustrating a packet 200 including hardware state information that is used to configure a graphics processing core according to some embodiments. The packet 200 can be part of a packet stream that is generated by an application such as the application 115 shown in FIG. 1. The packet 200 includes one or more entries such as the entries AA, AB, . . . , AN shown in FIG. 2. Each of the entries AA, AB, . . . , AN includes hardware state information that can be used to configure a graphics processing core such as the graphics processing core 110 shown in FIG. 1. For example, each of the entries AA, AB, . . . , AN can include configuration data and corresponding register addresses that can be used to configure registers such as the registers 108 shown in FIG. 1. For another example, each of the entries AA, AB, . . . , AN can include a list of configuration data and corresponding addresses that are stored in a memory. The list can be used to access the stored configuration data and addresses, which can then be used to configure the registers associated with the graphics processing core. For yet another example, each of the entries AA, AB, . . . , AN can include a hash to a list of configuration data and corresponding addresses that are stored in a memory.

A filter such as the software filter 130 or the hardware filter 165 shown in FIG. 1 is configured to filter the packet based on a corresponding adaptive list 205 such as the adaptive lists 135 and 170 shown in FIG. 1. The adaptive list 205 includes entries AA, AB, . . . , AN, BA, BB, . . . , BN, . . . that include hardware state information that was previously used to configure the graphics processing core. As discussed above, the entries AA, AB, . . . , AN, BA, BB, . . . , BN, . . . can hold configuration data, addresses of the destination of the configuration data, lists of configuration data and corresponding addresses, hashes of the lists of configuration data and corresponding addresses, and the like. The filter compares the entries in the packet 200 to the entries in the adaptive list 205 to determine whether all of the entries in the packet 200 are the same as entries in the adaptive list 205. In the illustrated embodiment, the entries AA, AB, . . . , AN in the packet 200 are also present in the adaptive list 205 (a hit), so the filter determines that the packet 200 includes redundant information that does not need to be forwarded to a packet processor such as the packet processor 175 shown in FIG. 1. The filter therefore removes or drops the packet 200 from the packet stream. Although a single packet 200 is compared to the entries in the adaptive list 205, some embodiments of the adaptive list 205 are compared to groups of packets on the basis of the hardware state information in entries of the packets in the group and a group identifier, e.g., by comparing hashed combinations of the configuration data in packet entries and the group identifier.

The adaptive list 205 can then be modified in response to the packet 200 hitting in the adaptive list 205. For example, if the adaptive list 205 is implemented as a linked list, the entries AA, AB, . . . , AN can be moved to the head of the linked list. The adaptive list 205 can also be modified in response to misses. For example, if the adaptive list is implemented as a linked list, entries at the tail of the linked list can be removed and the entries AA, AB, . . . , AN can be added to the head of the linked list in response to a miss. For another example, if the adaptive list 205 is implemented as a cache or a CAM, least-recently-used entries in the adaptive list 205 can be evicted and replaced with the entries AA, AB, . . . , AN in response to a miss.

Figure 3:
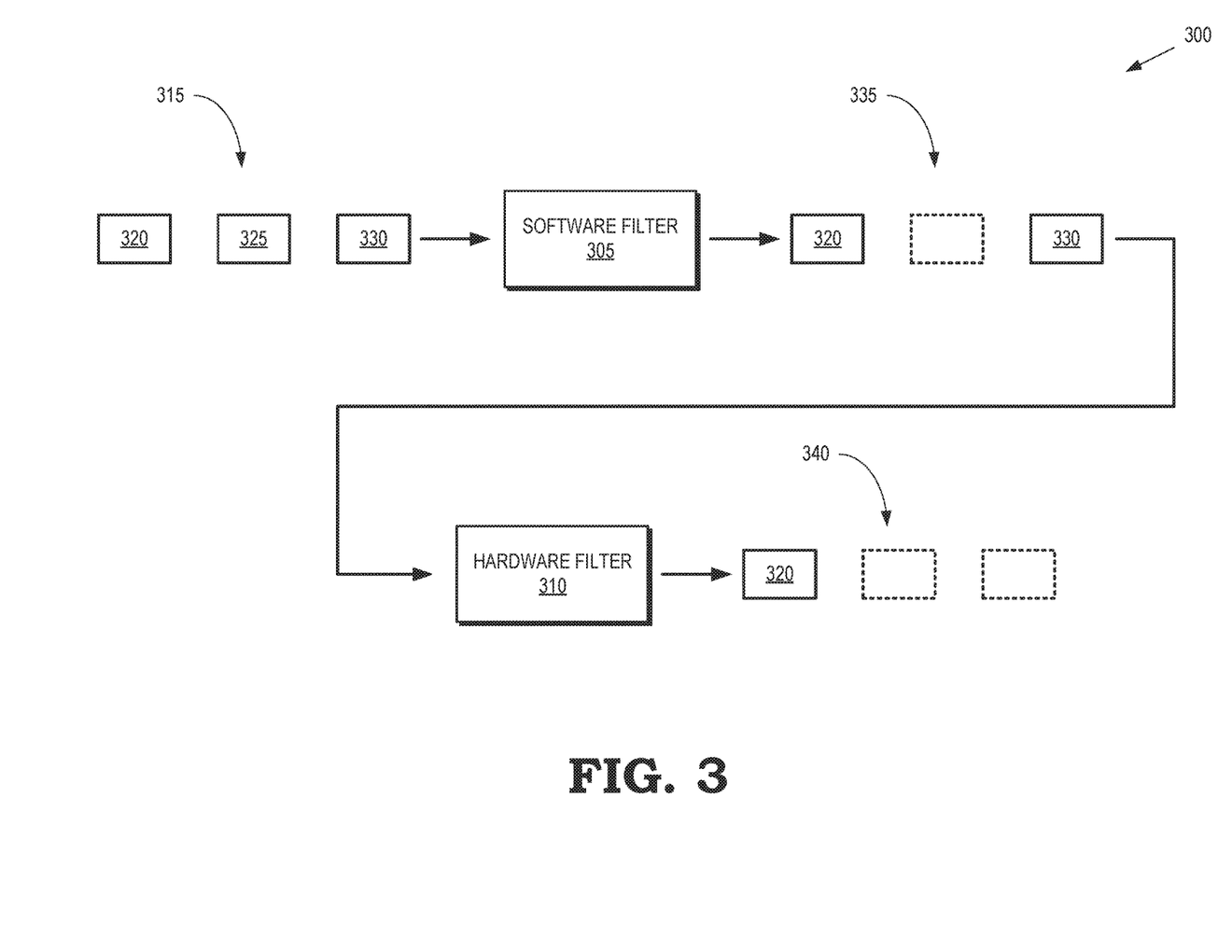
FIG. 3 is a block diagram of a processing system including a software filter and a hardware filter for filtering packets that include hardware state information for a graphics processing core according to some embodiments.

FIG. 3 is a block diagram of a processing system 300 including a software filter 305 and a hardware filter 310 for filtering packets that include hardware state information for a graphics processing core according to some embodiments. The software filter 305 and the hardware filter 310 can be used to implement some embodiments of the software filter 130 and the hardware filter 165, respectively, shown in FIG. 1. A packet stream 315 including packets 320, 325, 330 is generated by a graphics application such as the application 115 shown in FIG. 1. The packet stream 315 is then provided to a software filter 305. As discussed herein, the software filter 305 can selectively filter the packets 320, 325, 330 depending on whether throughput is limited by the graphics processing core. In the illustrated embodiment, processing is graphics-core-limited and so the software filter 305 is enabled to filter packets 320, 325, 330 in the packet stream 315. However, in other cases, filtering by the software filter 305 can be bypassed. The software filter 305 determines that the packet 325 includes redundant hardware state information, e.g., based on a comparison to an adaptive list such as the adaptive list 135 shown in FIG. 1. The software filter 305 therefore generates a filtered packet stream 335 that includes the packets 320, 330.

The filtered packet stream 335 is provided to the hardware filter 310, which filters the packets 320, 330 based on comparisons to an adaptive list such as the adaptive list 170 shown in FIG. 1. In the illustrated example, the hardware filter 310 determines that the packet 320 includes at least some hardware state information that differs from the hardware state information included in the adaptive list. The hardware filter 310 also determines that all of the hardware state information in the packet 330 is the same as hardware state information stored in the adaptive list. The hardware filter 310 therefore removes or drops the packet 330 to form the filtered packet stream 340, which is provided to a packet processor.

Figure 4:
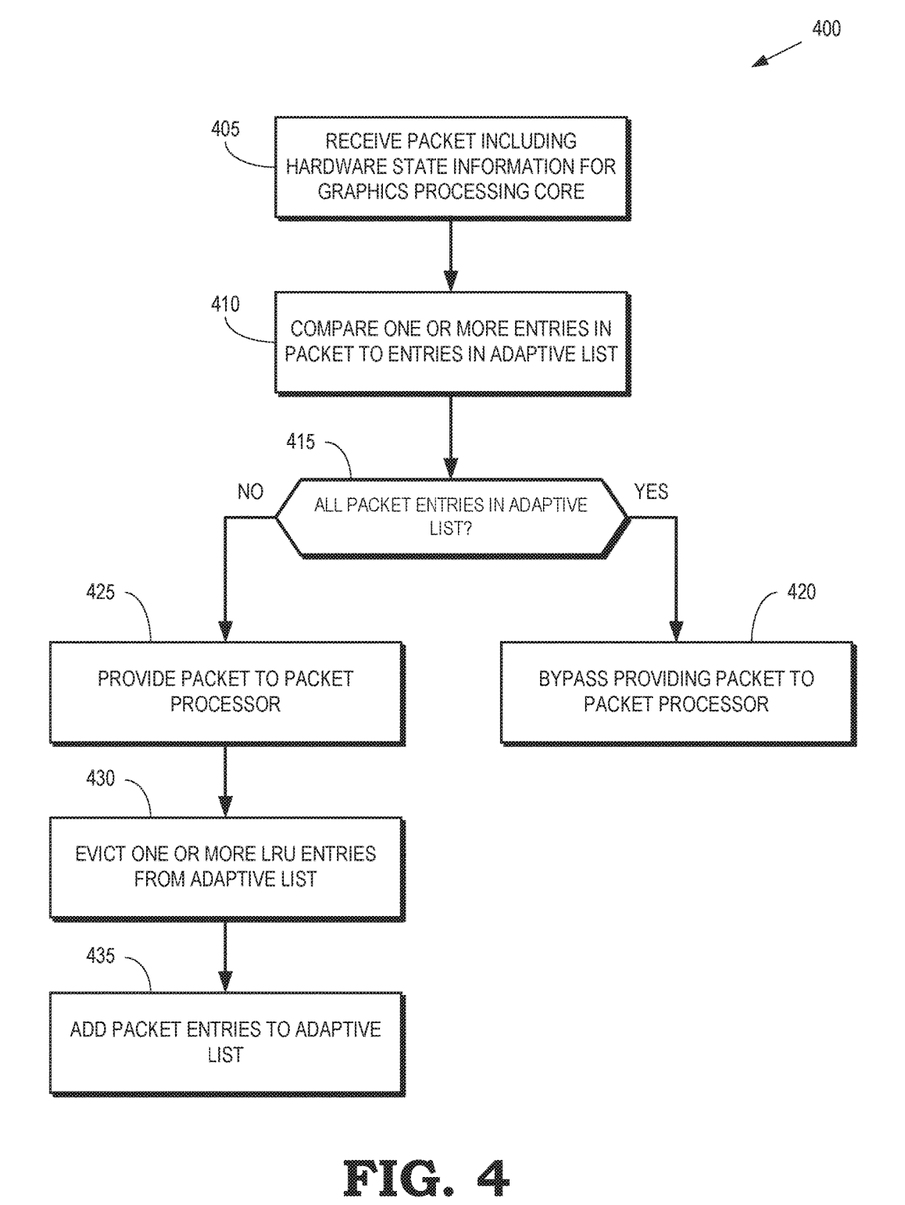
FIG. 4 is a flow diagram of a method of filtering packets using a hardware filter according to some embodiments.

FIG. 4 is a flow diagram of a method 400 of filtering packets using a hardware filter according to some embodiments. The method 400 is implemented in a filter module such as some embodiments of the hardware filter 165 shown in FIG. 1 and the hardware filter 310 shown in FIG. 3.

At block 405, the hardware filter receives a packet including hardware state information that is indicative of configuration data that is used to configure a graphics processing core such as the graphics processing core 110 shown in FIG. 1. At block 410, the hardware filter compares one or more entries in the packet to entries in an adaptive list such as the adaptive list 170 shown in FIG. 1 or the adaptive list 205 shown in FIG. 2.

At decision block 415, the hardware filter determines whether the hardware state information included in all the entries in the packet is the same as previously received hardware state information that is stored in the adaptive list. If so, the hardware state information included in the packet is redundant with the previously received hardware state information and the hardware filter bypasses (at block 420) providing the packet to a packet processor. If at least some of the hardware state information in the entries of the packet differs from the previously received hardware state information that is stored in the adaptive list, the method 400 flows to block 425.

At block 425, the packet is provided to a packet processor so that the information stored in the packet can be used to configure the graphics processing core. In response to filtering the packet out of the packet stream at block 425, the adaptive list is modified. At block 430, one or more least-recently-used entries are evicted from the adaptive list. At block 435, entries in the filtered packet are added to the adaptive list so that the hardware state information in these entries can be compared to hardware state information in subsequently received packets for potential filtering of the subsequently received packets.

Figure 5:
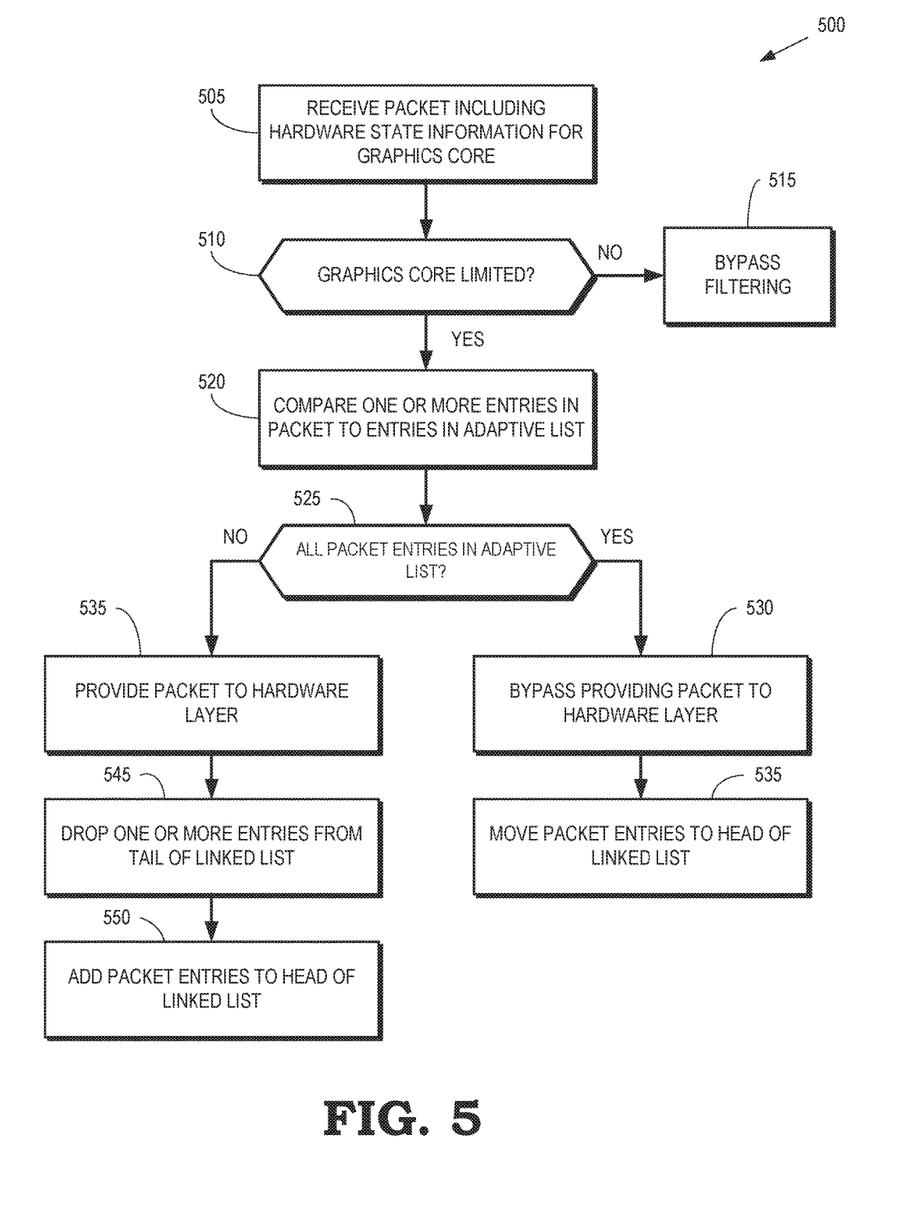
FIG. 5 is a flow diagram of a method of selectively filtering packets using a software filter according to some embodiments.

FIG. 5 is a flow diagram of a method 500 of selectively filtering packets using a software filter according to some embodiments. The method 500 is implemented in a filter module such as some embodiments of the software filter 130 shown in FIG. 1 and the software filter 305 shown in FIG. 3.

At block 505, the software filter receives a packet including hardware state information that is indicative of configuration data that is used to configure a graphics processing core such as the graphics processing core 110 shown in FIG. 1.

At decision block 510, the software filter (or other entity implemented by the CPU that supports the software filter) determines whether the graphics processing system is graphics-core-limited. For example, the graphics processing system can be determined to be graphics-core-limited in response to the CPU failing to receive a draw call or dispatch request from the GPU (or graphics processing core) for an interval of time that indicates that the GPU (or graphics processing core) is a bottleneck in the pipeline. If the graphics processing system is not graphics-core-limited, filtering by the software filter is bypassed at block 515. For example, the software filter can be configured to pass through all received packets in response to determining that the graphics processing system is not graphics-core-limited. For another example, the software filter can be disabled in response to determining that the graphics processing system is not graphics-core-limited. If the graphics processing system is graphics-core-limited, the method 500 flows to block 520.

At block 520, the software filter compares one or more entries in the packet to entries in the adaptive list. In the illustrated embodiment, the adaptive list is implemented as a linked list of entries that are linked in order from the head of the linked list to the tail of the linked list. However, the adaptive list can also be implemented as a CAM or other data structure.

At decision block 525, the software filter determines whether the hardware state information included in all the entries in the packet is the same as previously received hardware state information in entries of the adaptive list. If all the entries in the packet hit in the adaptive list, the method 500 flows to block 530. If at least some of the entries in the packet missing the adaptive list, the method 500 flows to block 535.

At block 530, the software filter bypasses providing the packet to the hardware layer because the software filter has determined that the hardware state information included in the packet is redundant with previously received hardware state information. Bypassing provision of the packet to the hardware layer includes dropping or consuming the packet at the software filter. At block 540, the adaptive list is modified in response to the entries in the packet hitting in the adaptive list. For example, the entries in the linked list corresponding to the entries in the packet can be moved to the head of the linked list to indicate that these entries are the most-recently-used entries in the linked list.

At block 535, the software filter provides the packet to the hardware layer because the software filter has determined that at least some of the hardware state information included in the packet is different than the previously received hardware state information in the adaptive list. The adaptive list is modified in response to at least some of the entries in the packet missing in the adaptive list. For example, at block 545, one or more entries in the adaptive list are dropped from the tail of the linked list since these are the least-recently-used entries in the linked list. At block 550, entries including the hardware state information that differed from the previously received hardware state information are added to the head of the linked list, which indicates that these entries are the most-recently-used entries in the linked list.

In some embodiments, the apparatus and techniques described above are implemented in a system comprising one or more integrated circuit (IC) devices (also referred to as integrated circuit packages or microchips), such as the graphics processing system described above with reference to FIGS. 1-5. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device can be stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    filtering a first packet out of a packet stream directed to a graphics processing core, wherein the first packet is filtered based on a comparison of hardware state information included in the first packet and an adaptive list of previously received hardware state information that has been used to configure the graphics processing core;
    modifying the adaptive list in response to filtering the first packet; and
    wherein filtering the first packet comprises comparing information representing configuration data in the first packet and an address indicating a destination of the configuration data to information representing at least one combination of previously received configuration data and a destination of the previously received configuration data stored in the adaptive list.

2. The method of claim 1, wherein filtering the first packet comprises filtering the first packet using a hardware filter, and wherein the adaptive list comprises at least one of a cache or a first content-addressable memory (CAM).

3. The method of claim 2, wherein filtering the first packet comprises dropping the first packet if the hardware filter determines that all configuration data in the first packet is the same as configuration data in a previously received packet.

4. The method of claim 3, wherein modifying the adaptive list comprises removing a least-recently-used entry from the cache or the first CAM in response to the hardware filter determining that some of the configuration data in the first packet differs from previously received configuration data and adding the configuration data in the first packet to the cache or the first CAM.

5. The method of claim 1, wherein:
    the adaptive list comprises a first adaptive list and a second adaptive list, the first adaptive list comprising at least one of a cache or a first content-addressable memory (CAM) and the second adaptive list comprising at least one of a linked list or a second CAM; and
    filtering the first packet comprises:
        filtering the packet stream using a hardware filter and the first adaptive list to provide a filtered packet stream; and filtering the filtered packet stream using a software filter and the second adaptive list to provide a filtered packet stream to the hardware filter.

6. The method of claim 5, wherein filtering using the software filter comprises selectively filtering the first packet using the software filter based on whether the graphics processing core is limiting throughput.

7. The method of claim 5, wherein modifying the adaptive list comprises adding a new entry to a head of the linked list in response to the software filter determining that some configuration data in the first packet differs from previously received configuration data and moving an existing entry to the head of the linked list in response to the software filter determining that the configuration data in the first packet is the same as previously received configuration data in the existing entry.

8. A method comprising:
filtering a first packet out of a packet stream directed to a graphics processing core, wherein the first packet is filtered based on a comparison of hardware state information included in the first packet and an adaptive list of previously received hardware state information that has been used to configure the graphics processing core;
modifying the adaptive list in response to filtering the first packet; and
wherein filtering the first packet comprises filtering a group of packets including the first packet based on a comparison of information representing a group identifier of the group of packets and configuration data in the group of packets and information representing at least one combination of a previously received group identifier and configuration data in a previously received group.

9. An apparatus comprising:
a storage element to store an adaptive list of previously received hardware state information that has been used to configure a graphics processing core;
at least one filter module to filter a first packet from a packet stream directed to the graphics processing core, wherein the filter module filters the first packet based on a comparison of hardware state information included in the first packet and the previously received hardware state information stored in the adaptive list;
a processor to modify the adaptive list in response to filtering the first packet; and
wherein the at least one filter module is configured to compare information representing configuration data in the first packet and an address indicating a destination of the configuration data to information representing at least one combination of previously received configuration data and a destination of the previously received configuration data stored in the adaptive list.

10. The apparatus of claim 9, wherein the at least one filter module is further configured to filter a group of packets including the first packet based on a comparison of information representing a group identifier of the group of packets and configuration data in the group of packets and information representing at least one combination of a previously received group identifier and configuration data in a previously received group.

11. The apparatus of claim 9, wherein the at least one filter module comprises a hardware filter, and wherein the storage element comprises at least one of a cache or a first content-addressable memory (CAM).

12. The apparatus of claim 11, wherein the hardware filter is configured to drop the first packet in response to determining that all configuration data in the first packet is the same as configuration data in a previously received packet.

13. The apparatus of claim 11, wherein the processor removes a least-recently-used entry from the cache or the first CAM in response to the hardware filter determining that some configuration data in the first packet differs from previously received configuration data and the configuration data in the first packet is added to the cache or the first CAM.

14. The apparatus of claim 11, wherein the at least one filter module comprises a software filter that provides a filtered packet stream to the hardware filter, and wherein the adaptive list comprises at least one of a linked list or a second CAM.

15. The apparatus of claim 14, wherein the software filter is configured to selectively filter the first packet based on whether the graphics processing core is limiting throughput.

16. The apparatus of claim 14, wherein the processor modifies the adaptive list by adding a new entry to a head of the linked list in response to the software filter determining that some configuration data in the first packet differs from previously received configuration data and moving an existing entry to the head of the linked list in response to the software filter determining that the configuration data in the first packet is the same as previously received configuration data in the existing entry.

17. A method comprising:
determining whether throughput of a graphics processing system is limited by a graphics processing core;
at a software filter, selectively filtering packets from a packet stream directed to the graphics processing core to form a filtered packet stream in response to the graphics processing core limiting throughput, wherein the packets are filtered based on a comparison of hardware state information included in the packets and a first adaptive list of previously received hardware state information that has been used to configure the graphics processing core;
modifying the first adaptive list in response to filtering the packets;
at a hardware filter, filtering packets from the filtered packet stream based on a comparison of the hardware state information included in the packets and a second adaptive list of previously received hardware state information that has been used to configure the graphics processing core; and
modifying the second adaptive list in response to filtering the packets.

18. The method of claim 17, further comprising:
storing the first adaptive list at one or more of: of a linked list or a first content-addressable memory (CAM); and
storing the second adaptive list at one or more of: a cache or a second CAM.

19. An apparatus comprising:
a storage element to store an adaptive list of previously received hardware state information that has been used to configure a graphics processing core;
a processor to determine whether throughput of a graphics processing system is limited by the graphics processing core;
a software filter to selectively filter packets from a packet stream directed to the graphics processing core to form a filtered packet stream in response to determining the graphics processing core is limiting throughput, wherein the packets are filtered based on a comparison of hardware state information included in the packets and a first adaptive list of previously received hardware state information that has been used to configure the graphics processing core;

a hardware filter to filter packets from the filtered packet stream based on a comparison of the hardware state information included in the packets and a second adaptive list of previously received hardware state information that has been used to configure the graphics processing core; and the processor to modify the first adaptive list in response to filtering the packets by the software filter and to modify the second adaptive list in response to filtering the packets by the hardware filter.

20. The apparatus of claim 19, further comprising:

one or more of a linked list or a first content-addressable memory (CAM) to store the first adaptive list; and one or more of a cache or a second CAM to store the second adaptive list.

\* \* \* \* \*